United States Patent

Steiro

[15] 3,667,620
[45] June 6, 1972

[54] SELF-CONTAINED UNLOADING APPARATUS

[72] Inventor: Harry Steiro, Madison, Wis.
[73] Assignee: Wisconsin Foundry and Machine Company, Madison, Wis.
[22] Filed: Oct. 20, 1970
[21] Appl. No.: 82,359

[52] U.S. Cl. ..................... 214/1 P, 193/40, 214/77, 214/85, 214/130
[51] Int. Cl. ........................................... B60p 1/48
[58] Field of Search ............... 214/77, 77 P, 78, 80, 130, 214/85, 1 P, 1 PB, 142; 193/40, 32; 221/290, 295, 298; 91/390, 5, 406; 92/134; 187/12

[56] References Cited

UNITED STATES PATENTS

| | | | |
|---|---|---|---|
| 2,789,707 | 4/1957 | Wolf | 214/77 R |
| 3,545,791 | 12/1970 | Lugash | 214/77 P |
| 2,776,762 | 1/1957 | Schmidgall | 214/77 R |
| 3,042,231 | 7/1962 | Cyphert | 214/77 R |
| 3,517,838 | 6/1970 | Lugash | 214/77 P |
| 2,414,447 | 1/1947 | Cargile | 214/85 |
| 2,234,255 | 3/1941 | Hunsaker | 187/12 |
| 2,231,087 | 2/1941 | Protin | 214/1 P B |

FOREIGN PATENTS OR APPLICATIONS

| | | | |
|---|---|---|---|
| 156,469 | 8/1963 | U.S.S.R. | 214/1 P B |
| 1,247,950 | 8/1967 | Germany | 214/6 D K |

*Primary Examiner*—Robert J. Spar
*Attorney*—James E. Nilles

[57] ABSTRACT

A material handling unit for detachable connection to the rear end of a vehicle and which permits gravitational unloading of heavy objects such as heavy concrete pipes from the bed of a truck. The unit is self-contained and can be easily attached to or detached from the vehicle. The unit contains its own hydraulic system including the extensible cylinders, fluid pump, reservoir and control apparatus.

8 Claims, 10 Drawing Figures

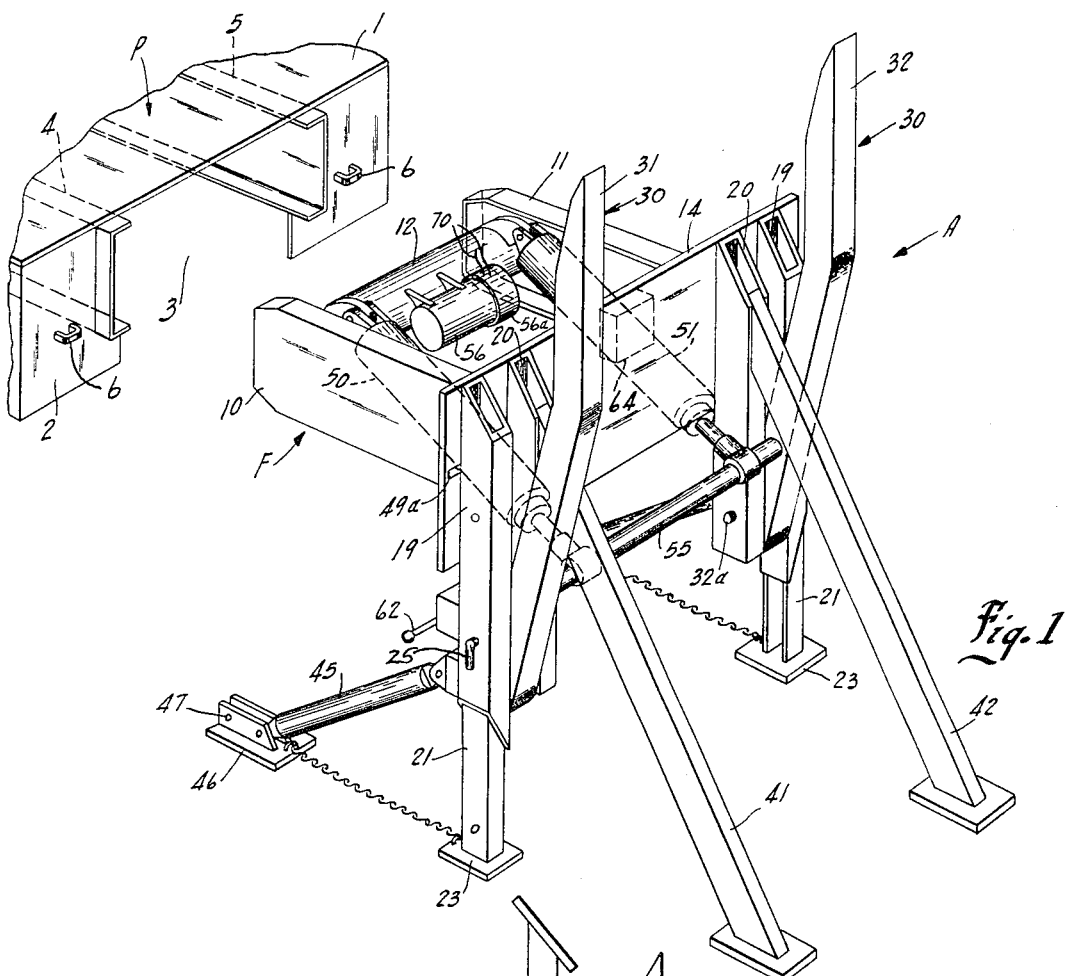
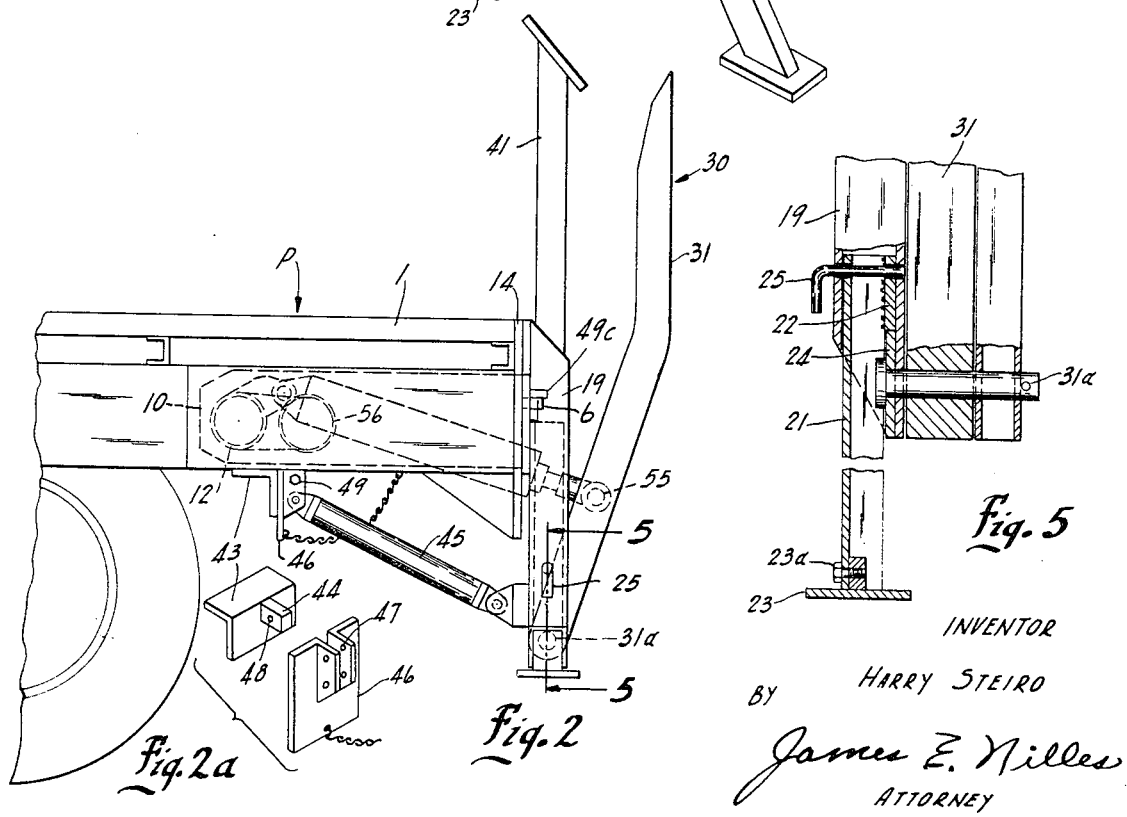

INVENTOR
HARRY STEIRO
BY
James E. Nilles
ATTORNEY

SELF-CONTAINED UNLOADING APPARATUS

BACKGROUND OF THE INVENTION

The present invention pertains to material or article handling apparatus and more particularly, to self-unloading or unloading vehicles. The apparatus includes a vertically swinging load support arm means and also cooperating guide rails for supporting and guiding the object being lowered by the arm means.

An example of unloaders of this general type are shown in the U.S. Pat. 2,776,762, issued Jan. 8, 1957, and entitled "Vehicle Unloading Apparatus". The present invention is an improvement over said prior art apparatus in that it can more accurately and gently control the unloading movement of the pipes which are often large and relatively fragile in nature. Furthermore, the prior art devices were not self-contained, but instead had numerous attaching parts and control mechanisms that required adjustment, for example, to the vehicle being unloaded.

SUMMARY OF THE INVENTION

The present invention provides apparatus for gravitationally unloading objects from the edge of a vehicle or the like and which apparatus is entirely self-contained including the power operating mechanism and control therefor.

Another aspect of the invention relates to guide rail means which cooperate with downwardly swinging load supporting arm means to thereby accurately and positively guide the article being unloaded. The entire unit, including the guide rail means, can be readily assembled or disassembled from the vehicle and can be easily stored.

Another aspect of the invention relates to a novel fluid operating means which is mounted directly on the apparatus and which includes a reservoir that acts as a storage tank for the fluid as well as acting as a rigidifying frame member.

These and other objects and advantages of the present invention will appear hereinafter as this disclosure progresses, reference being made to the accompanying drawings.

BRIEF DESCRIPTION OF THE DRAWINGS

FIG. 1 is a perspective view of the unit and showing it in disassembled relationship to the unloading vehicle, the latter of which is shown only fragmentarily;

FIG. 2 is a side elevational view of the unit shown in FIG. 1, showing the unloading arms in a moved position, and the unit attached to the platform, and with the support legs in the transport position;

FIG. 2a is an exploded, perspective view of the detachable mounting brackets for fastening the unloader to the truck body;

FIG. 5 is a fragmentary, rear elevational view of the connection between the unit frame, the support leg, and the pivotal arm, certain parts being shown as broken away and in section for the sake of clarity;

DESCRIPTION OF THE PREFERRED EMBODIMENT

Figure 3:
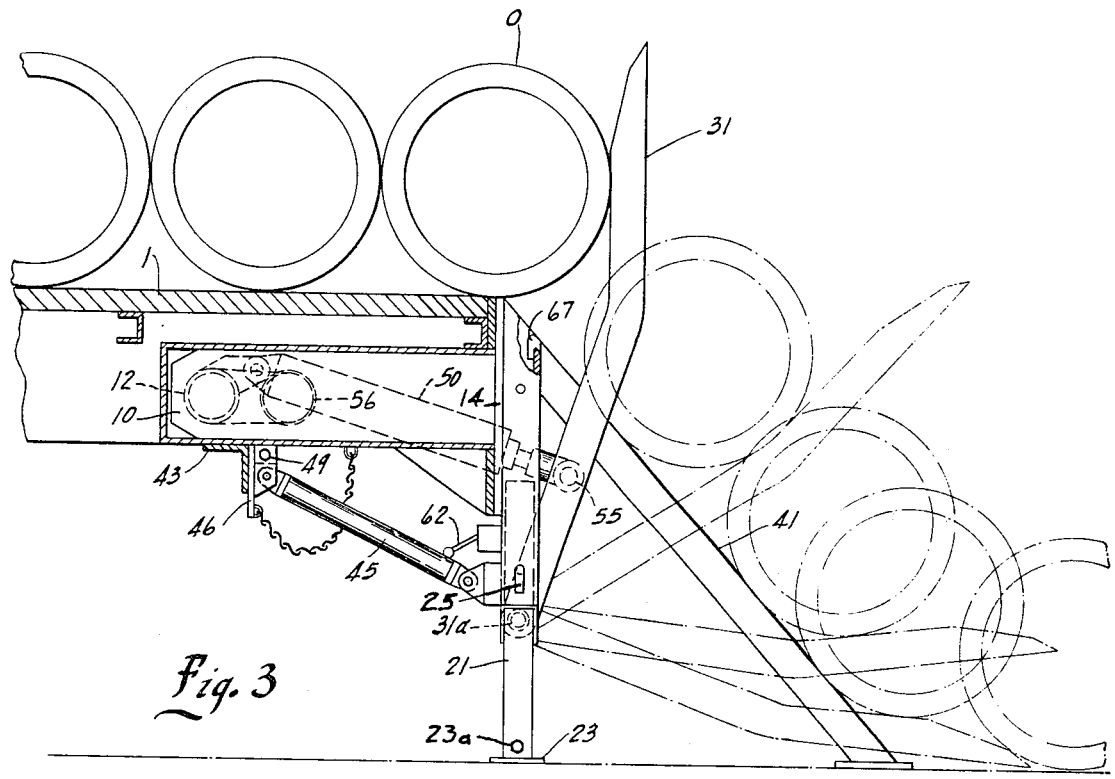
FIG. 3 is an elevational view, similar to FIG. 2, with certain parts shown as being broken away or in section with the support legs in the ground engaging position, and showing the pivotal arms in various positions relative to the guide rails.
Figure 4:
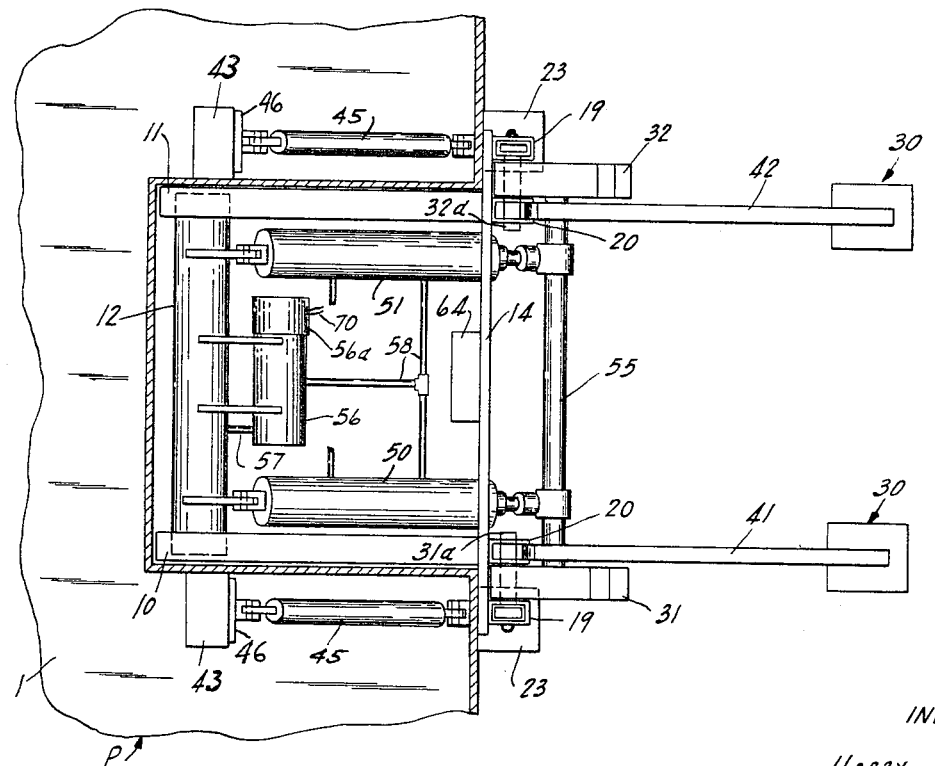
FIG. 4 is a plan view of the device shown in FIG. 3.

The apparatus A can be used to unload objects from a stationary platform or from the platform of a vehicle and such a vehicle platform P has been shown only in a fragmentary manner. The platform includes an upper, flat surface 1, a rear, generally vertical surface 2 in which an opening 3 is formed by oppositely facing steel channel members 4 and 5. The rear surface 2 also has a pair of lugs 6 extending rearwardly therefrom which comprise part of a detachable connecting means for the apparatus.

FRAME

The unloading apparatus includes a frame F which can be inserted into and removed from the opening 3 and which can be locked in position on the vehicle.

More specifically, the frame F includes two laterally spaced, oppositely facing C-shaped channel members 10 and 11 which are rigidly fixed together at one end by a large tubular member 12. A vertically disposed steel plate 14 is rigidly secured to the other end of members 10 and 11, as by welding.

The frame of the unit also includes a pair of vertically disposed, tubular support members 19 and 20, one pair being secured as by welding adjacent each side of the plate 14. Support member 19 may be considered the outer support member while support member 20 will be referred to as the inner support member.

TELESCOPING LEGS

A ground engaging leg 21 is telescopingly mounted within the outer support member 19. The leg 21 is formed from a C-shape channel member and has a guide plate 22 (FIG. 5) welded across its upper end between its parallel sides. The leg 21 has a detachable pad 23 at its lower end which is detachably fixed thereto by the bolt means 23a which extends through a hole in the lower portion of the leg and through an alignable hole in the pad member. A bearing plate 24 (FIG. 5) is welded to the interior of the lower end of the support member 19 and when the leg is in a downwardly extended, supporting position, as shown in FIG. 5, the guide plate of the leg abuts against the bearing plate of the support member. The retractable leg is held in this extended position by the removable pin means 25 which extends through the support member and through the leg.

To assemble the leg in the tubular support member, the detachable pad 23 is not attached to the leg and the leg is then inserted into the tubular member from the upper end thereof. Then the pad 23 is attached to the lower end of the leg.

RESERVOIR

The large tubular member 12 is welded between and at either end to the vertical webs of the C-shaped channel members 10 and 11. As will appear, this tubular member 12 acts as a reservoir for the fluid for the power operating unit and furthermore acts as a rigidifying structural member for the frame.

PIVOTAL ARMS

Arm means 30 are pivotally mounted at one end to the frame for swinging between an upper position and a lower discharging position. More specifically, the arm means includes a pair of arms 31 and 32 which are pivotally attached, respectively, on pins 31a and 32a which extend through the support members 19 and 20, and through the arms 31 and 32. The arm means have a free end which as shown in FIG. 1 is located above the unloading platform when in the object receiving position. These free ends can then be swung downwardly in an arcuate movement and to a discharge position as shown by the lowest broken line position in FIG. 3. Thus, as the arms swing in a downwardly direction, the object O rolls off the platform and is carried by the arm means to a lower position.

The present invention finds particular utility in unloading large and heavy objects such as concrete pipe, which pipe is also relatively fragile in nature. It is therefore necessary to be able to smoothly and rather gently lower these large objects without any bumping or shock.

GUIDE MEANS

For the purpose of insuring smooth and gentle handling of the objects, guide rail means have been provided for cooperation with the arm means as the latter lowers the object. More specifically, the guide rail means includes a pair of guide rails 41 and 42 which are detachably connected at one end to the inner support member 20 and extend rearwardly and downwardly from their point of attachment.

Figure 6:
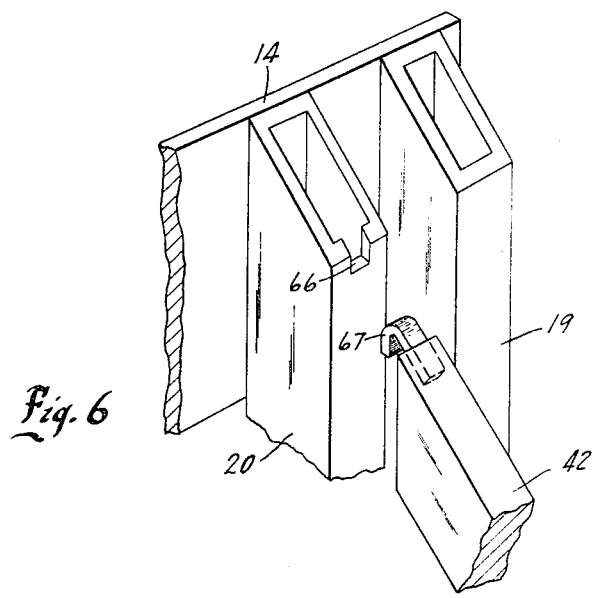
FIG. 6 is a fragmentary, perspective view, on an enlarged scale, of the detachable means for connecting the guide rail to the frame of the unit.

The guide rail means are connected to the inner support member 20 in such a manner that they can be easily moved between the unloading position shown in FIG. 3 and an upper storage position as shown in FIG. 2. In other words, a quickly detachable connection is provided between the frame and guide rails and this connection includes a slot 66 (FIG. 6) in the inner support member 20 and a hook 67 fixed at the end of the rails and which engage the slot. When the guide rails are in the upper position as shown in FIG. 2, the unit can be readily stored without the guide rails being lost or misplaced.

As shown in FIG. 3, as the object is being lowered by the arm means, the object is also being supported and guided by the guide rails. Thus, the object does not drop abruptly or move erratically in the lowering direction. Instead, the object is under control at all times due to the combined action of the arm means and the guide rail means. This is true even during the lower movement of the object, that is at the final stages of unloading when the arm means are in their lower position.

ATTACHING MEANS

The entire unit can be quickly and easily attached to and detached from the platform as follows. The platform has an angle iron 43 rigidly fixed thereto and at each side thereof and a rearwardly extending tang (FIG. 2a) 44 is welded to the angle iron. A brace 45 is pivotally mounted to the rear side of the outer support member 19 and this brace 45 has a bracket 46 pivoted to its other end. This bracket in turn is bifurcated and has an aperture 47 extending through the bifurcated portion, which aperture 47 is alignable with an aperture 48 in tank 44. Thus, a bolt means 49 can be inserted through the aligned aperture when the brace 45 is in the position shown in FIG. 3, thereby attaching the apparatus rigidly to the truck frame. If additional locking means is required, a pair of slots (49a/FIG. 2) may be formed in the steel plate 14 of the apparatus so as to receive the pair of alignable lugs 6 extending rearwardly from the vehicle frame. Removable pins 49c (FIG. 2) are then inserted into the lugs after the lugs have been engaged in the slots of plate 14.

POWER OPERATED, ACTUATING MEANS

Actuating means are provided for raising the arm means and this actuating means is carried directly and entirely on the frame F. The arm actuating means includes a pair of extensible cylinder means 50 and 51, each including a cylinder 53 having a piston 54 slideable relatively therein. Fluid pressure is admitted to the rod end of the cylinder means, to power operate the means in the retracting direction, to thereby raise the arm means. These cylinder means are attached at one of their ends to the tubular reservoir 12 and the other of their ends are attached to the cross brace 55 rigidly fixed between arms 31 and 32. Pressure fluid is provided by an electrically operated hydraulic pump 56 which is also attached to the central portion of the tubular reservoir 12. Suitable conduits 57 are connected between the reservoir 12 and the pump, and suitable conduits 58 are also connected between the pump and the cylinder means for delivering pressure fluid to the rod end thereof. Conduit means 59 connect the head end of the cylinder to four port, three position, closed center valve 64.

It will be appreciated that the cylinder means is used to raise the arm means, the weight of the object being unloaded is sufficient to cause the arm means to lower. In other words, the unloading takes place by gravitation.

However, in order to control the lowering movement of the arm means even though it is gravity actuated, a throttling valve 60 is provided in the fluid operating means for restricting the flow of fluid in one direction, consequently restricting the lowering movement of the arm means.

The fluid operating means also includes a fluid control handle 62 (FIG. 1) which is located at one side of the frame and readily accessible to the operator. A four-way, fluid control valve 64 is also provided in the fluid circuit and is carried directly on the frame, more specifically, on the inside of the vertical plate 14, and is operated by the handle 62.

Figures 7, 8:
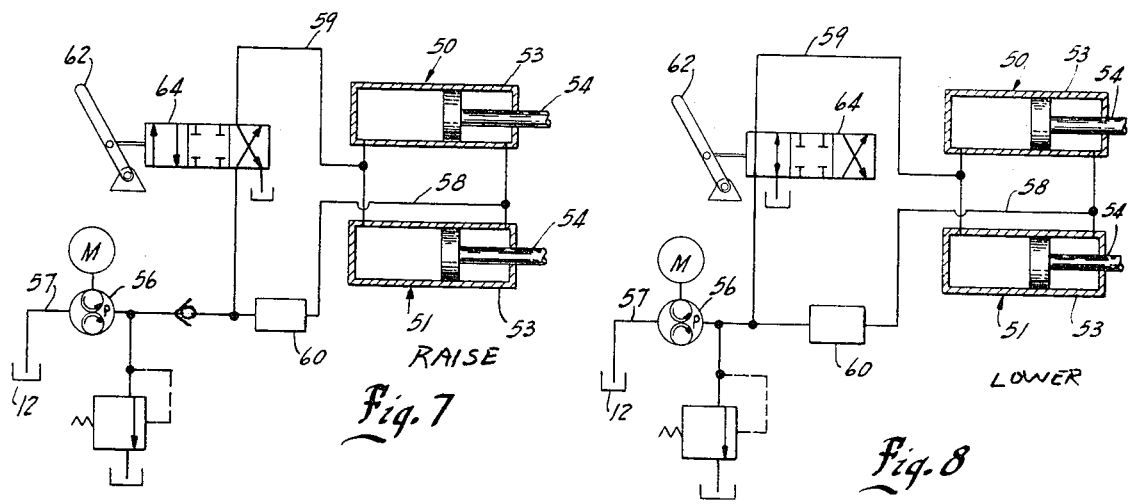
FIGS. 7, 8 and 9 are hydraulic circuit diagrams used with the present invention and showing the four port, three position, closed center valve in various positions.

As shown in FIG. 7, in order to raise the arms, fluid pressure is directed to the rod end of the cylinders, thus raising the arms. However, in order to control the speed of the upward movement of the arms, the fluid is discharged from the head end of the cylinders through the valve 64 to the sump.

When it is desired to permit the forks to be lowered by gravity, the pressurized fluid, as shown in FIG. 8 is permitted to flow to the head end of the cylinders, and the fluid is discharged from the rod end of the cylinders and through valve 60 and permitted to flow to the head end of the cylinders, thus forming a closed circuit and controlling the speed of lowering.

Figure 9:
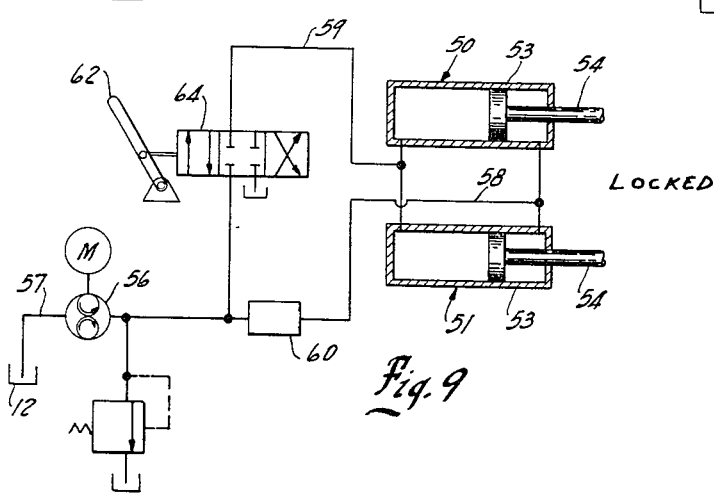

In order to stop the arm movement altogether, the pressure fluid is trapped in both ends of the cylinder when the valve 64 is closed as shown in FIG. 9.

RESUME

The invention provides an apparatus for gravitation unloading of objects from the edge of a platform by means of arms which are pivotally mounted on the frame and which arms have a free end swingable between an upper position and a lower discharge position. The guide rail means are also mounted on the frame and extend downwardly and away from the frame for cooperative guiding relationship with the arms in controlling and guiding the objects downwardly along the guide rails as the arms swing from the upper to the lower positions. The electric motor 56a (FIG. 1) of the electrically operated fluid pump 56 can conveniently receive its electrical energy from an electrical power source (not shown) on the vehicle, for example, by means of the detachable electric lines 70. Thus, power operated means is carried on the frame as an integral part thereof and controls the movement of the arms in either direction.

I claim:

1. Apparatus for gravitationally unloading objects from the edge of an elevated platform or the like, comprising:
    an upright frame extending downwardly from said platform;
    arm means pivotally mounted on said frame and having a free end swingable between an upper position above said platform for receiving an object and a lower position for discharging said object;
    guide rail means mounted on said frame and extending downwardly and inclined away from said frame to a lower surface for guiding said object downwardly therealong as said arm means swings from said upper to said lower position; and
    power operated means carried on said frame for swinging said arm means.

2. The apparatus set forth in claim 1 further characterized in that said power operated means comprises, an electric motor driven fluid pump mounted on said frame, extensible cylinder means connected between said frame and said arm means and actuated by said fluid pump for swinging said arm means, a fluid reservoir mounted on said frame and in fluid communication with said pump means, and fluid control means on said frame and connected with said pump for controlling said power operated means.

3. The apparatus set forth in claim 2 further characterized in that said reservoir comprises a tubular member welded to said frame and also acting to rigidify said frame.

4. The apparatus as claimed in claim 2 further characterized in that said control means includes a throttling valve for regulating the lowering movement of said arm means.

5. The apparatus as claimed in claim 3 further characterized in that said control means includes a throttling valve for regulating the lowering movement of said arm means.

6. The apparatus of claim 1 including a shiftable connection between said frame and said guide rail means whereby the latter can be swung to an upper position on said frame for storage.

7. A self contained apparatus for gravitationally unloading objects from an elevated platform or the like and comprising:
   an upright frame extending downwardly from said platform;
   arm means pivotally mounted on said frame and having a free end swingable between an upper position for receiving an object to be unloaded and a lower position for discharging said object;
   guide rail means mounted on said frame and extending downwardly and inclined away from said frame and to a lower position for guiding said object downwardly therealong as said arm means swings from said upper to said lower position;
   power operated means carried on said frame for swinging said arm means, said power operated means including a fluid pump mounted on said frame, extensible cylinder means connected between said frame and said arm means and actuated by said fluid pump for swinging said arm means; and
   a fluid reservoir comprising a tubular member welded to said frame and also acting to rigidify said frame.

8. The apparatus as claimed in claim 7 including fluid control means on said frame and connected with said pump for controlling said power operated means, said control means including a throttling valve for regulating the lowering movement of said arm means.

* * * * *